Aug. 24, 1937.　　　　J. T. NEEDHAM　　　　2,090,697
BELT CONVEYER
Filed Sept. 2, 1933　　　　3 Sheets-Sheet 1
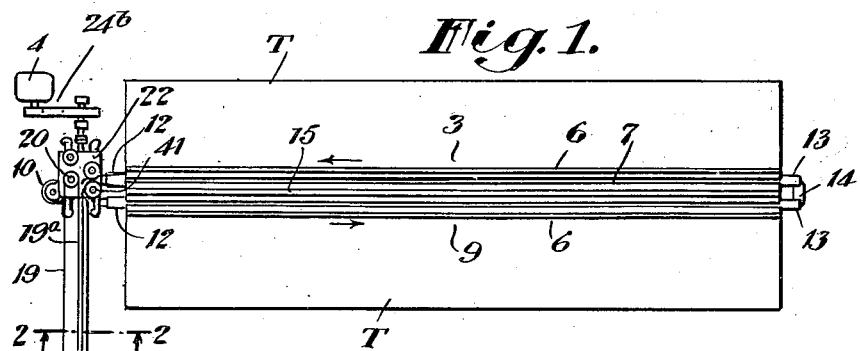
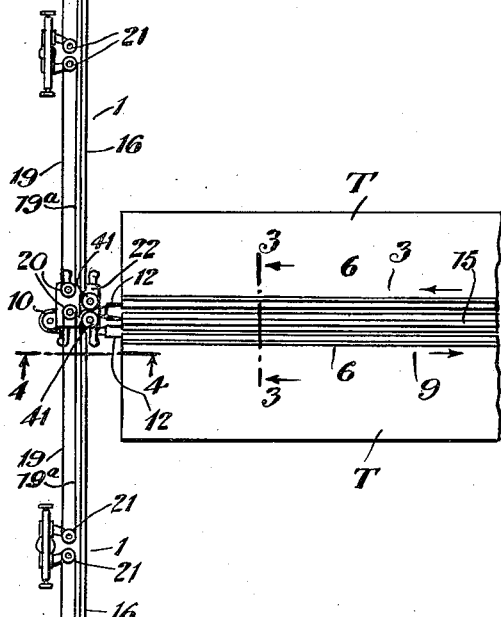
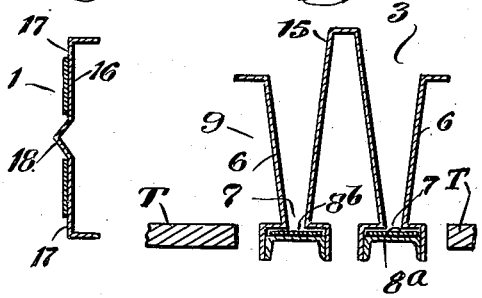
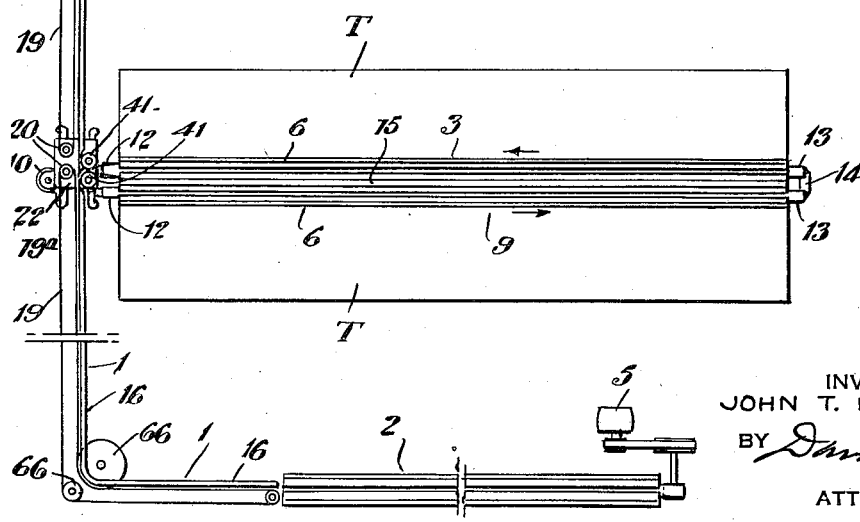
INVENTOR
JOHN T. NEEDHAM
BY
ATTORNEYS

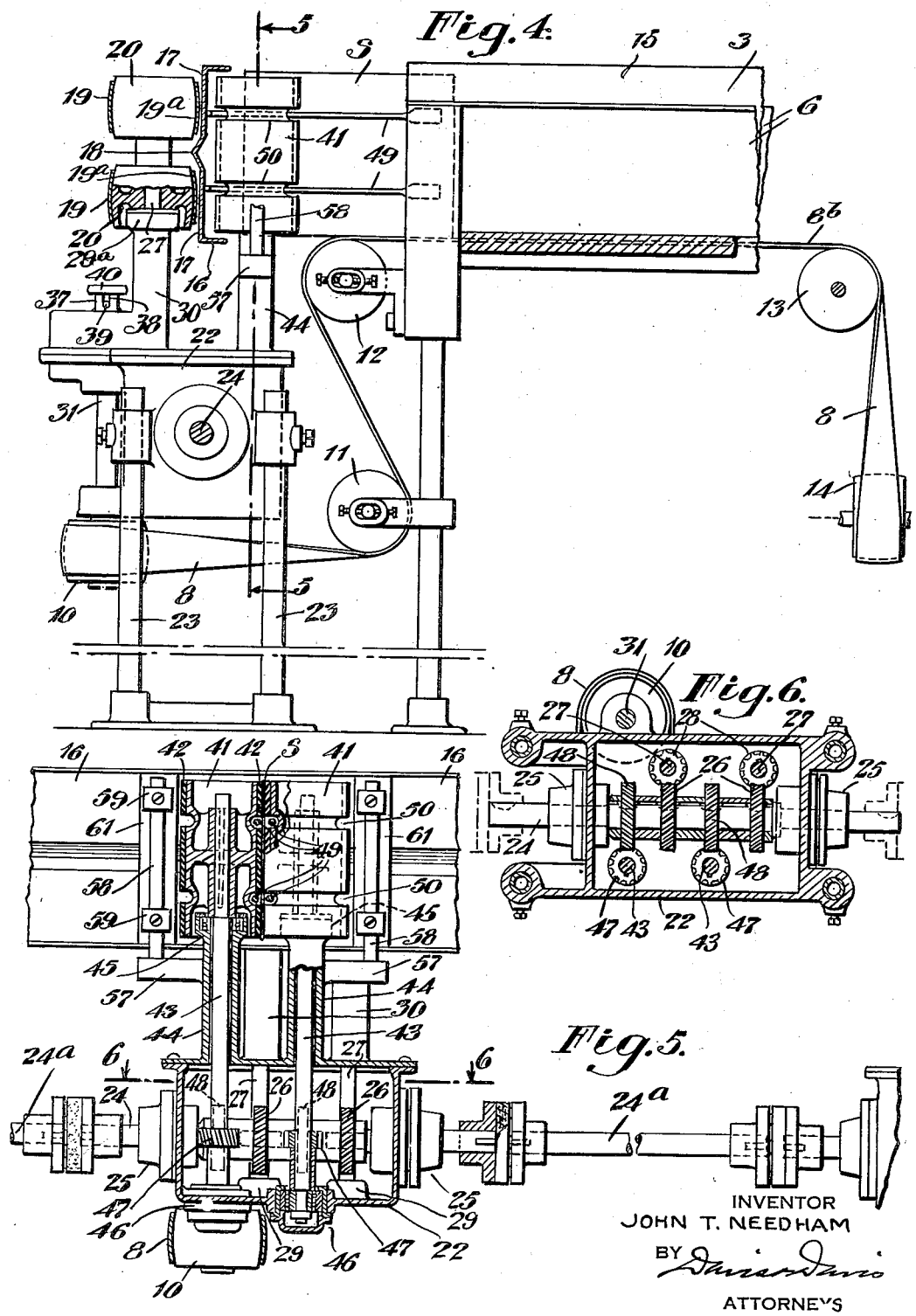
Aug. 24, 1937. J. T. NEEDHAM 2,090,697
BELT CONVEYER
Filed Sept. 2, 1933 3 Sheets-Sheet 2
INVENTOR
JOHN T. NEEDHAM
BY
ATTORNEYS

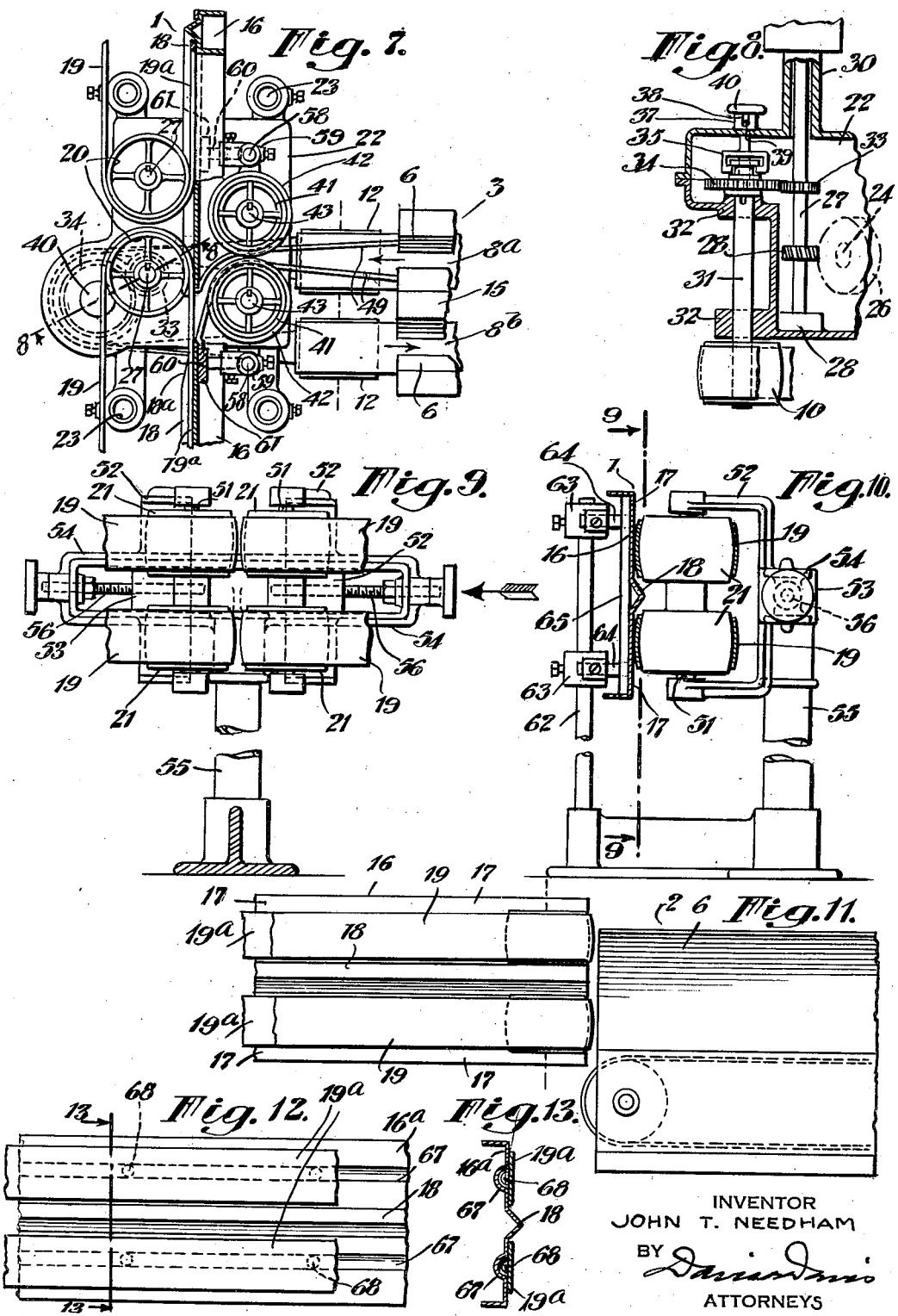

Patented Aug. 24, 1937

2,090,697

UNITED STATES PATENT OFFICE 2,090,697

BELT CONVEYER

John T. Needham, North Plainfield, N. J., assignor to Lamson General Conveyors Limited, Montreal, Quebec, Canada, a corporation of Canada Application September 2, 1933, Serial No. 687,946

13 Claims. (Cl. 198—160)

This invention relates more particularly to a belt conveyer system for conveying sheets such as telegram sheets, for example.

Important objects of the invention are to provide an improved belt sheet conveyer system for telegraph offices or the like, enabling sheets to be conveyed by trough conveyer lines along tables at which the operators sit, and delivered directly and positively to a single sheet conveyer pick-up line running laterally directly past the ends of the tables; to provide an improved belt conveyer system embodying a combination of several connected belt conveyer lines of different character designed and coordinated to convey sheets in an improved manner along the several lines in succession; to provide such a conveyer system designed to maintain the sheets in substantially upright position as they are conveyed along the several connected lines, and to provide, in such a conveyer system, an improved combination of a laterally running conveyer pick-up line of the drag belt type and a belt conveyer feed line of the trough type running laterally at an angle to said pick-up line and in positive delivery connections therewith, to convey sheets edgewise and maintain them in substantially upright position from the time they are deposited in the trough of the feed line until they are discharged from the pick-up line.

Other objects of the invention will appear hereinafter.

In the drawings, Fig. 1 is a diagrammatic top plan view of the belt conveyer system as employed in a telegraph office or the like;

Fig. 2 an enlarged vertical section on the line 2—2 of Fig. 1;

Fig. 3 an enlarged vertical section on the line 3—3 of Fig. 1;

Fig. 4 an enlarged vertical section on the line 4—4 of Fig. 1;

Fig. 5 a section approximately on the line 5—5 of Fig. 4;

Fig. 6 a section approximately on the line 6—6 of Fig. 5;

Fig. 7 a top plan view of one of the delivery junctures between a feed conveyer line and the pick-up line;

Fig. 8 a vertical section on the line 8—8 of Fig. 7;

Fig. 9 a section on the line 9—9 of Fig. 10, showing in side elevation one of the belt tensioning devices of the pick-up conveyer line;

Fig. 10 a view showing said tensioning device in end elevation and the pick-up line in cross section, looking in the direction of the arrow in Fig. 9;

Fig. 11 a side elevation of the discharge end of the belt conveyer pick-up line and the associated receiving end of the belt conveyer receiving line;

Fig. 12 a fragmentary side elevation of the pick-up line showing a modification thereof; and Fig. 13 a section on the line 13—13 of Fig. 12.

In Fig. 1 the lay-out of the belt conveyer system is illustrated as employed in a telegraph office having long parallel tables T at which the operators sit. A pick-up conveyer line 1 runs laterally past one end of the row of tables and has its discharge end in delivery communication with a lateral receiving conveyer line 2. A feed conveyer line 3 runs laterally along each table and, between the discharge end of said feed line and the pick-up line there is a delivery juncture to feed sheets positively from the feed line to the pick-up line. The feed lines and also the receiving line 2 are of the narrow V-trough type and the pick-up line 1 is of a drag belt type.

Operators seated along the tables T deposit the telegram sheets in the troughs of the feed lines 3 for conveyance to the pick-up line. The latter conveys them to the receiving line 2. Preferably the receiving line is driven at a much lower rate of speed than the pick-up line and the sheets are picked out of the trough of the receiving line, sorted and dispatched on their proper routes, as designated in the telegrams. The pick-up line 1, the feed lines 3 and the power driven means for transferring sheets from the feed lines to the pick-up line are, in the present instance, all driven by a single motor 4 through shafting which extends along the pick-up line, and through transmission gear mechanisms located adjacent the junctures between the feed lines and the pick-up line. The receiving line is driven by a motor 5. All of the lines and also the line junctures are designed and coordinated to convey the sheets edgewise and maintain them in substantially upright position from the time they are deposited in the feed line troughs until they are removed from the trough of the final, or receiving line.

Each feed line is of a well-known type. It includes a narrow trough 6 of substantially V-shaped cross section and having a narrow longitudinal slot 7 at its bottom. A conveyer belt 8 is trained to provide a conveyer reach 8ª extending along the line directly beneath the trough slot. This belt may be trained back idly along the line but in the present instance it is trained to form another conveyer reach 8ᵇ serving a parallel reversely running line 9 close alongside the line 3. This line also has a V-trough 6 and the line may deliver to a pick-up line at the far end of the table from line 1; or it may deliver to a receptacle at the table end. At the end of the table adjacent the pick-up line 1, the belt 6 is trained around a drive pulley 10 on a vertical axis, twisted and trained around a pair of pulleys 11 on a horizontal axis and then trained upward and around a pair of pulleys 12 on a horizontal axis. At the far end of the table the belt is trained around a pair of pulleys 13; thence downward and twisted and trained around a pulley 14 disposed with its axis horizontal and at a right angle to the axis of the pulleys 13. The pulleys 11 and 12 are supported on shafts mounted for adjustment to tension the belt. The adjacent sides of the troughs along the lines 3 and 9 extend upward above the outer edges of the troughs and form a partition 15 to prevent placing of the sheets into the wrong trough. This trough feature is disposed in a co-pending patent application Serial No. 592,249, filed February 11, 1932.

The pick-up line 1 is of a design similar to that disclosed and claimed in Patent No. 2,028,231. The line includes a sheet guiding and supporting plate 16 extending along the line. Preferably the plate is formed of sheet metal shaped to form flat parallel belt tracks 17 and a longitudinal rib 18 extending along the line between said tracks. In the present invention the sheet guiding and supporting plate is mounted to dispose the belt tracks in a vertical plane. Opposed to the plate are companion drag belts 19 trained to provide conveyer reaches 19a running side by side along the tracks 17. In the present instance there are two pairs of said belts extending in succession along the line between adjacent ones of the tables T. At points opposite the table ends the belts of each pair are trained around a pair of drive pulleys 20 and at an intermediate point between the tables the belts are trained around pairs of pulleys 21 adjustably mounted for tensioning the belts as will be explained hereinafter. All of said pulleys are disposed with their axes vertical.

The pulleys 20 of the pick-up line belts and the pulleys 10 of the feed line belts are all driven from the motor 4. The driving connection between the motor and said pulleys include transmission gear mechanisms each located near the juncture of a feed line 3 with the pick-up line. Below each juncture there is an oil-tight gear box or casing 22 supported by standards 23 mounted on the floor. A horizontal drive shaft 24 extends through the gear box in a longitudinal direction with respect to the pick-up line and is supported in bearings 25 at the opposite ends of the box. A pair of spiral gears 26 are keyed to said shaft. Extending vertically through the gear box is a pair of shafts 27 having spiral gears 28 keyed thereto and meshing with the gears 26. Said shafts 27 extend above the gear box and have the belt pulleys 20 keyed thereto. The shafts are supported by bearings 29 at the bottom of the box and by bearings 29a at the pulleys. The cover of the gear box has tubular extensions 30 supporting the bearings 29. Shafting 24a extends between the shafts 24 of the several transmission mechanisms and has slip joint connections with the shaft 24. The motor has a driving connection 24b with the shaft 24 nearest the motor. Thereby all of the shafts 24 are driven in unison by the motor.

The drive pulley 10 for the adjacent feed line is keyed to the lower end of a vertical shaft 31 at the exterior of the gear box and supported in bearings 32 on the gear box. For driving the shaft 31 one of the shafts 27 has a spur gear 33 keyed thereto and meshing with a gear 34, of materially greater diameter, keyed to shaft 31. Thereby the feed line belt is driven from the shaft 24 but at a slower speed than the belts of the pick-up line. Provision is also made for cutting any one of the feed lines out of service independently of the others and independently of the pick-up-line. For this purpose the gear 34 is mounted for sliding upward on its shaft 31 to a position out of mesh with the drive gear 33. Gear 34 has a hub with a peripheral groove. A shift yoke 35 engages in said groove and has a shank 36 projecting upward through a bearing boss 37 on the top of the gear box. Said boss has a notch 38 and the shank 36 has a lateral pin 39 normally in said notch, and a knob 40. To disable the drive of the feed line belt said knob is raised to retract the pin from the notch and the knob is twisted to engage the pin with the top of the bearing boss. Thereby the gear 34 is locked in an elevated position out of mesh with gear 33.

Between the discharge end of each feed line 3 and the pick-up line 1 there is a pair of power-driven rollers 41 to grip the sheets as they are discharged from the trough 6 and positively transfer them to the pick-up line. Said rollers are disposed with their axes vertical and they have peripheral facings 42 of rubber or other suitable compressible material, in contact to grip the sheets therebetween. The rollers are keyed to vertical shafts 43 extending downward into the gear box. The top of the gear box has tubular extensions 44 through which the shafts extend and said extensions support bearings 45 for the rollers. At their lower ends the shafts are supported by bearings 46 on the bottom of the gear box. Within the gear box the shafts have spiral gears 47 keyed to them. Spiral drive gears 48 are keyed to the drive shaft 24 and are in mesh with the gears 47, to drive the rollers from the motor 4.

Means are provided for guiding the sheets from the trough of each feed line 3 to the feed rollers 41 and from the latter to the pick-up line. At the discharge end of the trough are guide strands 49 which may be formed of stiff wire. They extend forward from the opposite sides of the trough and converge to pass between the rollers. To afford clearance for the strands the rollers have peripheral grooves 50 through which the strands pass. From the rollers the strands extend into the pick-up line and are curved in the direction of travel of the pick-up line. They define a restricted throat to guide the sheets from the rollers to the pick-up line between the track-forming plate 16 and the belts of the line. In the present instance a pair of the strands lead from each side of the trough and they are vertically spaced to meet the pick-up line at opposite sides of the ridge 18 of the track-forming plate. All of the strands are secured at their rear ends to the trough sides. Where the strands meet the pick-up line at intermediate points of the latter the plate 16 has entrance gaps for the sheet. The plate may be formed in sections having their ends spaced apart to provide the gaps. The restricted throats defined by the sheet-guiding strands open into the gaps. Each gap occurs directly opposite the conveyer reaches of the belts 19. The strands of one pair are secured at their forward ends to the plate section at one side of the gap and the strands of the other pair are secured at their forward ends to the plate section at the opposite side of the gap.

The belts 19 are tensioned for proper drag co-operation with the track-forming plate 16 by adjustment of the tensioning pulleys 21. In each group of said pulleys each pair of co-axial pulleys is mounted on a vertical shaft 51 and the shaft is supported by a yoke 52. Rigid with each yoke there is a supporting block 53 mounted to slide in a horizontal guide frame 54. Said frame is rigidly supported by a standard 55 having a base secured to the floor. The guide frame is elongated lengthwise of the pick-up line and each block 53 has a threaded bore. Lag screws 56 are swiveled in the opposite ends of the frame and are screwed through the threaded bores of said blocks. The screws have knobs to turn them, for adjusting the yokes along the guide frame and thereby adjusting the pulleys to place the belts under the required tension to hold their conveyer reaches 19ª to the tracks 17 on the plate 16.

The successive sections of plate 16 are rigidly supported at the gear boxes and at the belt tensioning devices. At each gear box the extensions 44 have lateral ears 57 rigidly supporting posts 58. Collars 59 are adjustably secured to said posts and have rods 60 projecting laterally toward the pick-up and fixed to cleats 61 secured to the adjacent plate section. At each tensioning device there is a standard 62 supported by the base of the device. Collars 63 are adjustably secured to said standard and bear lateral rods 64 secured to a cleat 65 on the adjacent plate section. The rods 60 and 64 are mounted for longitudinal adjustment on their supporting collars and the collars are vertically adjustable on their supporting posts or standards. Thereby the plate sections may be accurately adjusted with relation to the belts.

In Fig. 1 the receiving line 2 is shown as disposed parallel to the feed lines 3. To reach the receiving line the pick-up line is formed with a bend and the belts 19 are trained around the bend by pulleys 66.

Operators seated along the tables drop the sheets into the troughs 6 of the feed lines and they are conveyed along the lines edgewise and substantially upright and delivered to the feed rollers 41. The latter hold the sheets upright and feed them positively through the throats formed by the guide strands 49, to the pick-up line. Figs. 4 and 5 show a sheet S being fed into the pick-up line by the rollers. Here the sheets are gripped between the belts 19 and the tracks 17 and dragged along the latter. At each entrance gap in the plate 16 the ridge 18 is tapered as at 18ª so that the medial portion of the sheet will ride up onto the crest of the ridge and be flexed out of the plane of the belts and tracks. This holds the sheets against vertical displacement. The pulleys 20 are quite close and the intermediate feed gaps are quite narrow so that sheets will pass the intermediate line junctures without possibility of escape. The sheets will be conveyed along the pick-up line in substantially upright position and so delivered to the receiving line 2. The trough of the latter will also support the sheets substantially upright. Preferably the operators will deposit the sheets in the feed line troughs in upright, readable position. Then the connected conveyer lines and their feed junctures will convey the sheets without reversal or inversion to the receiving line 2 from which they may be readily picked out and their addresses read, for routing the telegrams.

Heretofore, in conveyer systems for the service described, it has been customary to have the feed lines along the tables deliver to individual ascending conveyer lines and the latter in turn deliver to an overhead pick-up line. The present invention materially reduces the number of conveyer reaches required, as the feed lines deliver directly to a pick-up line which runs directly past the table ends and is disposed at approximately the level of the tables. The edgewise vertical disposal of the drag belt pick-up line is also a desirable feature. It is found that such a laterally running drag belt line when disposed on edge may be run at a much greater speed than when disposed flat. This is owing to the fact that the weight of the belts is not borne by the tracks and consequently much friction is eliminated. The ridge 18 enables the tracks to be disposed on edge without slippage of the sheets from beneath the belts.

In Figs. 12 and 13 there is shown a modification of the drag belt line. Here there is provided a sheet guiding and retaining plate 16ª longitudinally crimped at opposite sides of the ridge 18 to form grooves or slots 67 along the belt tracks. These grooves provide clearance for pick-up projections or bosses 68 on the conveyer face of the belt. Said bosses serve to positively propel the sheets along the tracks.

What I claim is:

1. A belt sheet conveyer system comprising a laterally running drag belt pick-up conveyer line arranged to convey sheets edgewise and substantially upright and having a lateral entrance at an intermediate point in the line for entrance of sheets to the line; a laterally running belt conveyer feed line leading toward said intermediate point in the length of said pick-up line and at an angle to the pick-up line and comprising a belt having a laterally running conveyer reach, and sheet guiding and supporting means extending along said belt reach to support sheets substantially upright and with their lower edges in contact with said belt reach, for conveyance of the sheets edgewise toward the pick-up line; a sheet delivery juncture between said lines including opposed power-driven rollers to grip sheets therebetween and transfer them edgewise and substantially upright from the feed line to the pick-up line at said intermediate point of the latter; a drive shaft; and a power transmission mechanism operatively connecting said shaft to the belts of the pick-up line and the feed line and to said rollers to drive said belts and rollers.

2. A belt sheet conveyer system including a laterally running drag belt pick-up line comprising a plurality of belts trained to provide companion conveyer reaches running side by side along the line in vertically spaced relation, sheet guiding and retaining means extending along said belt reaches to hold an interposed sheet to both belt reaches with the medial portion of the sheet bridging the space between the belt reaches for conveyance of the sheet edgewise and substantially upright along the line, and a ridge projecting laterally between said belt reaches and extending along the line to engage the medial portion of the sheet and hold it flexed as the sheet is conveyed; and a laterally running conveyer feed line to convey sheets edgewise and substantially upright and in delivery connection with said pick-up line to deliver sheets edgewise and substantially upright to the pick-up line.

3. A belt sheet conveyer system including a laterally running drag belt pick-up line comprising a plurality of belts trained to provide companion conveyer reaches running side by side along the line in vertically spaced relation, sheet guiding and retaining means extending along said belt reaches to hold an interposed sheet to both belt reaches with the medial portion of the sheet bridging the space between the belt reaches for conveyance of the sheet edgewise and substantially upright along the line, and a ridge projecting laterally between said belt reaches to engage the medial portion of the sheet and hold it flexed as the sheet is conveyed; a laterally running belt conveyor feed line disposed at an angle to said pick-up line and leading toward an intermediate point in the length of the latter and comprising a belt having a laterally running conveyer reach, and sheet guiding and supporting means extending along said belt reach to support sheets substantially upright and with their lower edges in contact with said belt reach for conveyance of sheets edgewise toward the pick-up line; and a sheet delivery juncture between said lines to transfer sheets edgewise and substantially upright from the feed line to the pick-up line at said intermediate point on the latter.

4. A drag belt conveyer line comprising a plurality of belts having conveyer reaches extending successively along the line and juxtaposed end to end, pulleys training said belts at said juxtaposed ends and mounted to shift transversely of their axes, sheet guiding and retaining means extending along said belt reaches to hold interposed articles to said reaches for drag conveyance, and manually operable adjusting means to shift said pulleys to adjust the tension of the belts.

5. A laterally running drag belt sheet conveyer line comprising a plurality of belts having conveyer reaches extending successively along the line and juxtaposed end to end, pulleys training said belts at said juxtaposed ends and disposed with their axes vertical and mounted for shifting transversely of their axes, sheet guiding and retaining means extending along said belt reaches and cooperable therewith for drag conveyance of interposed sheets edgewise and substantially upright; and manually operable adjusting means to shift said pulleys to adjust the tension of the belts.

6. A drag belt sheet conveyer line comprising a pair of transversely spaced parallel tracks for conveyed sheets extending side by side along the line, a pair of transversely spaced companion belt reaches trained to run side by side with their conveyer faces opposed to said tracks for drag conveyance of a sheet along the tracks by both belts with a medial portion of the sheet bridging the space between the belts, a ridge between the belts and extending along the tracks to engage the medial portion of the sheet and hold it flexed for the purpose set forth as the sheet is conveyed, the belt tracks having longitudinal slots opposed to the conveyer faces of said belt reaches, and pick-up projections on the conveyer faces of the belt reaches to run in said slots.

7. A belt sheet conveyer system including a laterally running drag belt conveyer line comprising belts trained to provide successive conveyer reaches juxtaposed end to end, pulleys training said belts at said juxtaposed ends of the conveyer reaches and disposed with their axes substantially vertical, and sheet guiding and retaining means extending along said belt reaches to hold sheets thereto for drag conveyance edgewise and substantially upright along the line, said sheet guiding means having a lateral entrance adjacent one of said pulleys for entry of sheets to the line; a laterally running belt conveyer feed line leading toward said entrance of the pick-up line at an angle to the pick-up line and comprising a belt trained to provide a conveyer reach running toward said entrance, and sheet guiding and supporting means extending along the belt reach to support sheets substantially upright with their lower edges in contact with the belt reach for conveyance of the sheets edgewise and substantially upright; peripherally opposed feed rollers disposed with their axes substantially vertical and arranged to receive sheets therebetween to feed them edgewise and substantially upright from the feed line into said entrance of the pick-up line; a drive shaft; and a power transmission mechanism operatively connecting said shaft to said pulleys and rollers to drive them.

8. A sheet conveyer system comprising a laterally running conveyer feed line to convey sheets edgewise and loosely support them substantially upright and opening upward therealong for downward insertion of sheets into the line, a laterally running receiving conveyer line to convey sheets edgewise and loosely support them substantially upright and opening upward therealong for free upward removal of the sheets from the line, a connecting conveyer line in receiving communication with said conveyer feed line and in delivery communication with said receiving line and comprising conveyer belt means to engage one face of the sheets and means to engage the opposite face of the sheets to hold the sheets to the belt means for conveyance along the line, said three lines and their communications being cooperable for disposal of the sheets conveyed by the receiving line and received from the other lines with the same edges of the sheets uppermost as were uppermost in the feed line, means to drive the feed line, means to drive the receiving line, and means to drive the connecting line at a higher speed than the feed line and the receiving line.

9. A sheet conveyer system comprising a plurality of laterally running conveyer feed lines to convey sheets edgewise and loosely support them substantially upright and each opening upward therealong for downward insertion of sheets into the line, a laterally running receiving conveyer line to convey sheets edgewise and loosely support them substantially upright and opening upward therealong for free upward removal of the sheets from the line, a connecting conveyer line in receiving communication with said conveyer feed lines and in delivery communication with said receiving line and comprising conveyer belt means to engage one face of the sheets and means to engage the opposite face of the sheets to hold the sheets to the belt means for conveyance along the line, one of said feed lines delivering to the connecting line at an intermediate point in the length of the latter and all of said lines running laterally in the same plane and the lines and their communications being cooperable for disposal of the sheets conveyed by the receiving line and received from the other lines with the same edges of the sheets uppermost as were uppermost in the feed line, means to drive the feed lines, means to drive the receiving line, and means to drive the connecting line at a higher speed than the feed lines and the receiving line.

10. In a sheet conveyer system including a laterally running belt conveyer pick-up line, a laterally running belt conveyer feed line and a delivery juncture between said feed line and the pick-up line at an intermediate point in the length of the latter, a power transmission mechanism comprising a drive shaft, an operative connection between said shaft and the conveyer belt means of the pick-up line, an operative connection between said shaft and the conveyer belt means of the feed line to drive the latter belt means at a lower speed than the belt means of the pick-up line, manually adjustable means to disable said operative connection between the said shaft and the conveyer belt means of the feed line to cut the feed line out of service independently of the pick-up line, rotary means at said juncture between the lines to engage sheets delivered by the feed line and positively feed them into the pick-up line, and means operatively connecting the shaft to said rotary means.

11. In a sheet conveyer system including a belt conveyer pick-up line, a belt conveyer feed line and a delivery juncture between said feed line and the pick-up line at an intermediate point in the length of the latter, a power transmission mechanism comprising a drive shaft, an operative connection between said shaft and the conveyer belt means of the pick-up line, an operative connection between said shaft and the conveyer belt means of the feed line to drive the latter belt means at a lower speed than the belt means of the pick-up line, rotary means at said juncture between the lines to engage sheets delivered by the feed line and positively feed them into the pick-up line, and means operatively connecting the shaft to said rotary means.

12. In a sheet conveyer system including a laterally running belt conveyer pick-up line, a laterally running belt conveyer feed line and a delivery juncture between said feed line and the pick-up line at an intermediate point in the length of the latter and in which system the pick-up line includes belt means extending along the line and sheet track means opposed to the belt means for conveyance of interposed sheets therealong by the belt means, a power transmission unit comprising a drive shaft, an operative connection between said shaft and the conveyer belt means of the pick-up line, an operative connection between said shaft and the conveyer belt means of the feed line to drive the latter belt means at a lower speed than the belt means of the pick-up line, manually adjustable means to disable said operative connection between the said shaft and the feed line to cut the feed line out of service independently of the pick-up line, rotary means at said juncture between the lines to engage the sheets delivered by the feed line and positively feed them into the pick-up line, and means operatively connecting the shaft to said rotary means; means adjustably supporting said track means on the power transmission unit; and means supporting said unit for vertical adjustment bodily.

13. In a sheet conveyer system including a laterally running belt conveyer pick-up line, a laterally running belt conveyer feed line and a delivery juncture between said feed line and the pick-up line at an intermediate point in the length of the latter and in which system the pick-up line includes belt means extending along the line and sheet track means opposed to the belt means for conveyance of interposed sheets therealong by the belt means, a power transmission unit comprising a drive shaft, an operative connection between said shaft and the conveyer belt means of the pick-up line, an operative connection between said shaft and the conveyer belt means of the feed line to drive the latter belt means at a lower speed than the belt means of the pick-up line, rotary means at said juncture between the lines to engage sheets delivered by the feed line and positively feed them into the pick-up line, and means operatively connecting the shaft to said rotary means; and means adjustably supporting said track means on the power transmission unit.

JOHN T. NEEDHAM.